United States Patent
Iwashita et al.

(10) Patent No.: US 11,351,962 B2
(45) Date of Patent: Jun. 7, 2022

(54) ELECTRONIC KEY SYSTEM

(71) Applicant: KABUSHIKI KAISHA TOKAI RIKA DENKI SEISAKUSHO, Aichi (JP)

(72) Inventors: Hiroaki Iwashita, Aichi (JP); Yoshiyuki Oya, Aichi (JP); Kazuki Naiki, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 0 days.

(21) Appl. No.: 16/344,062

(22) PCT Filed: Oct. 25, 2017

(86) PCT No.: PCT/JP2017/038507
§ 371 (c)(1),
(2) Date: Apr. 23, 2019

(87) PCT Pub. No.: WO2018/079600
PCT Pub. Date: May 3, 2018

(65) Prior Publication Data
US 2019/0256047 A1 Aug. 22, 2019

(30) Foreign Application Priority Data
Oct. 28, 2016 (JP) .............................. JP2016-212194

(51) Int. Cl.
*B60R 25/24* (2013.01)
*G01S 13/08* (2006.01)
(Continued)

(52) U.S. Cl.
CPC .............. *B60R 25/24* (2013.01); *E05B 49/00* (2013.01); *G01S 13/08* (2013.01); *H04Q 9/00* (2013.01);
(Continued)

(58) Field of Classification Search
CPC ........ E05B 49/00; G01S 13/08; G01S 13/765; B60R 25/24; B60R 25/245; H04Q 9/00; H04W 12/64; H04W 12/06
(Continued)

(56) References Cited

U.S. PATENT DOCUMENTS 10,477,346 B2 * 11/2019 Bruckner .............. H04W 4/023
2005/0068225 A1 * 3/2005 Inoue ....................... G01S 3/50
342/70

(Continued)

FOREIGN PATENT DOCUMENTS

JP 2011-153420 A 8/2011

OTHER PUBLICATIONS

International Search Report, dated Jan. 16, 2018, in International Patent Application No. PCT/JP2017/038507.

*Primary Examiner* — Vernal U Brown
(74) *Attorney, Agent, or Firm* — Greenblum & Bernstein, P.L.C.

(57) ABSTRACT

An electronic key system determines that legitimate communication has been performed on the basis of conditions including that a measured distance from a ranging request unit to a ranging response unit measured on the basis of a ranging request signal and a ranging response signal is within a threshold range that is set on the basis of the distance from a communication area of a transmission antenna where an electronic key is determined to be located by a key location determination unit to one of either the ranging request unit or the ranging response unit that is provided in an on-board device.

3 Claims, 4 Drawing Sheets

(51) Int. Cl.
*H04Q 9/00* (2006.01)
*E05B 49/00* (2006.01)
*H04W 12/64* (2021.01)
*B60R 25/20* (2013.01)

(52) U.S. Cl.
CPC ......... *H04W 12/64* (2021.01); *B60R 25/2072* (2013.01); *B60R 2325/108* (2013.01)

(58) Field of Classification Search
USPC ........................................................ 340/5.6
See application file for complete search history.

(56) References Cited

U.S. PATENT DOCUMENTS

| | | | |
|---|---|---|---|
| 2006/0034243 A1* | 2/2006 | Hermann | G07C 9/00309 370/343 |
| 2015/0004917 A1* | 1/2015 | Juzswik | H04B 17/318 455/67.13 |
| 2015/0170444 A1* | 6/2015 | Yasui | G07C 9/00007 340/5.61 |
| 2018/0106882 A1* | 4/2018 | Kanaga | G01S 11/06 |

* cited by examiner

ELECTRONIC KEY SYSTEM

TECHNICAL FIELD

The following description relates to an electronic key system.

BACKGROUND ART

A conventional electronic key system determines whether authorized communication is performed based on verification of ID codes and the like through transmission and reception of various types of signals including ID codes exchanged between an electronic key and a vehicle. If the electronic key system determines that verification is successful and authorized communication is being performed, the electronic key system, for example, allows a vehicle door to be locked or unlocked and the engine to be started. Patent Document 1 described an example of an electronic key system for a vehicle including an interior antenna that forms a communication area inside the vehicle and an exterior antenna that forms a communication area around the vehicle. If an ID code is verified through communication between the vehicle and the electronic key that is located in the vehicle exterior communication area (vehicle exterior verification), control is performed to change the lock state of a door lock. If an ID code is verified through communication between the vehicle and the electronic key that is located in a vehicle interior communication area (vehicle interior verification), the starting of the engine is allowed.

With the development of communication technology of recent years, communication may be performed in an unauthorized manner between a vehicle and an electronic key that is present at a location remote from the vehicle. For example, a relay device that relays radio waves between the electronic key and the vehicle may establish communication in an unauthorized manner between the electronic key and the vehicle even if the electronic key is at a remote location and outside the vehicle exterior communication area. Various types of measures have been taken against unauthorized communication caused by such a relay device. Patent Document 1 describes an example of such a countermeasure.

Specifically, the relay device includes a request signal relay unit and a response signal relay unit. The request signal relay unit receives a request signal from an onboard device installed in the vehicle and transmits the request signal to the electronic key. The response signal relay unit receives a response signal from the electronic key in response to the request signal and transmits the response signal to the vehicle.

The onboard device of the electronic key system transmits a first request signal (on LF band, for example) to a first communication area set inside and outside the vehicle. The onboard device also transmits a second request signal (on UHF band, for example) to a second communication area upon receipt of a response signal from the electronic key in response to the first request signal. The electronic key transmits response signals for the first request signal and the second request signal on the same frequency band as at least one of the request signals.

In a state in which the request signal relay unit and the response signal relay unit of the relay device are located close to each other, if signals are transmitted and received on the same frequency band, jamming occurs and prevents the establishment of unauthorized communication. The above construction determines the location of the electronic key relative to the vehicle based on a response signal to the first request signal and sets the second communication area to which the second request signal is transmitted based on the determined location. Thus, in a state in which the request signal relay unit and the response signal relay unit of the relay device are separated from each other, it is difficult for the request signal relay unit to receive the second request signal, and the establishment of unauthorized communication is restricted.

PRIOR ART DOCUMENT

Patent Document

Patent Document 1: Japanese Laid-Open Patent Publication No. 2011-153420

SUMMARY OF THE INVENTION

With the conventional structure, unauthorized communication may still be established if the request signal relay unit and the response signal relay unit are arranged so as to be separated from each other just enough to avoid the occurrence of jamming in the second communication area. Further, signals on the UHF band are used for the second request signals in many cases. Thus, the second communication area is relatively large as radio waves reach a relatively long distance. As a result, the request signal relay unit and the response signal relay unit can still be arranged so as to be separated from each other. In this regard, there is still room for improvement.

It is an objective of the present disclosure to provide an electronic key system that prevents the establishment of unauthorized communication via a relay device.

One aspect of the present disclosure provides an electronic key system including an onboard device installed in a vehicle and an electronic key carried by a user, wherein the electronic key system performs authenticity determination to determine whether authorized communication is performed based on response signals transmitted from the electronic key in response to a plurality of request signals from the onboard device, the electronic key system including: a key location determination unit that determines a location of the electronic key based on a location of a transmission antenna that transmits at least one of the plurality of request signals; a distance measurement request unit included in one of the onboard device and the electronic key, wherein the distance measurement request unit transmits a distance measurement request signal and receives a distance measurement response signal in response to the distance measurement request signal; and a distance measurement response unit included in the other one of the onboard device and the electronic key, wherein the distance measurement response unit receives the distance measurement request signal and transmits the distance measurement response signal in response to the distance measurement request signal. The electronic key system determines that authorized communication is performed based on a condition including that a measurement distance, which is measured from the distance measurement request unit to the distance measurement response unit based on the distance measurement request signal and the distance measurement response signal, is within a threshold range set based on a distance from a communication area of the transmission antenna, in which the key location determination unit determines that the electronic key is located, to one of the distance measurement request unit and the distance measurement response unit included in the onboard device.

When unauthorized communication is performed via the relay device, the distance measurement request signal and the distance measurement response signal are transmitted and received between the relay device and the electronic key that is located at a position remote from the vehicle (onboard device). Thus, the measurement distance, which is measured based on the distance measurement request signal and the distance measurement response signal transmitted and received via the relay device, differs from the distance from the relay device that is located in the communication area to the onboard device. In other words, if unauthorized communication is performed via the relay device, the calculated measurement distance is usually greater than the distance from the communication area of the transmission antenna to one of the distance measurement request unit and the distance measurement response unit that are included in the onboard device. Thus, establishment of unauthorized communication via the relay device is limited by setting the condition for determining authorized communication so as to include the measurement distance being within the threshold range that is based on the distance from the communication area to one of the distance measurement request unit and the distance measurement response unit that are included in the onboard device.

In the electronic key system, preferably, the distance measurement request signal and the distance measurement response signal are ultra-wideband wireless signals.

The above configuration accurately measures the measurement distance from one of the distance measurement request unit and the distance measurement response unit that are included in the onboard device to the other one of the distance measurement request unit and the distance measurement response unit included in the electronic key.

In the electronic key system, preferably, the transmission antenna is one of a plurality of transmission antennas, and the transmission antennas are arranged in the vehicle at different locations.

In a configuration determining authorized communication under the condition that the measurement distance is within the threshold range based on the distance from the communication area of the transmission antenna within which the electronic key is located to one of the distance measurement request unit and the distance measurement response unit that are included in the onboard device, a narrower threshold range can be set for a narrower communication area. This allows for accurately determination of the establishment of authorized communication. In this respect, a key location determination unit includes a plurality of transmission antennas. Thus, the location of the electronic key is determined over a wide area around the vehicle without enlarging the communication area of a single transmission antenna. This accurately authenticates the electronic key carried by the authorized user who may approach the vehicle from any of various directions.

In the electronic key system, preferably, the transmission antennas are arranged in the vehicle distanced differently from the distance measurement request unit or the distance measurement response unit included in the onboard device.

With the above structure, the threshold range differs between the transmission antennas that determine the location of the electronic key. This limits the establishment of unauthorized communication via a relay device.

The present disclosure prevents establishment of unauthorized wireless communication via a relay device.

MODES FOR CARRYING OUT THE INVENTION

One embodiment of an electronic key system will now be described with reference to the drawings.

Figure 1:
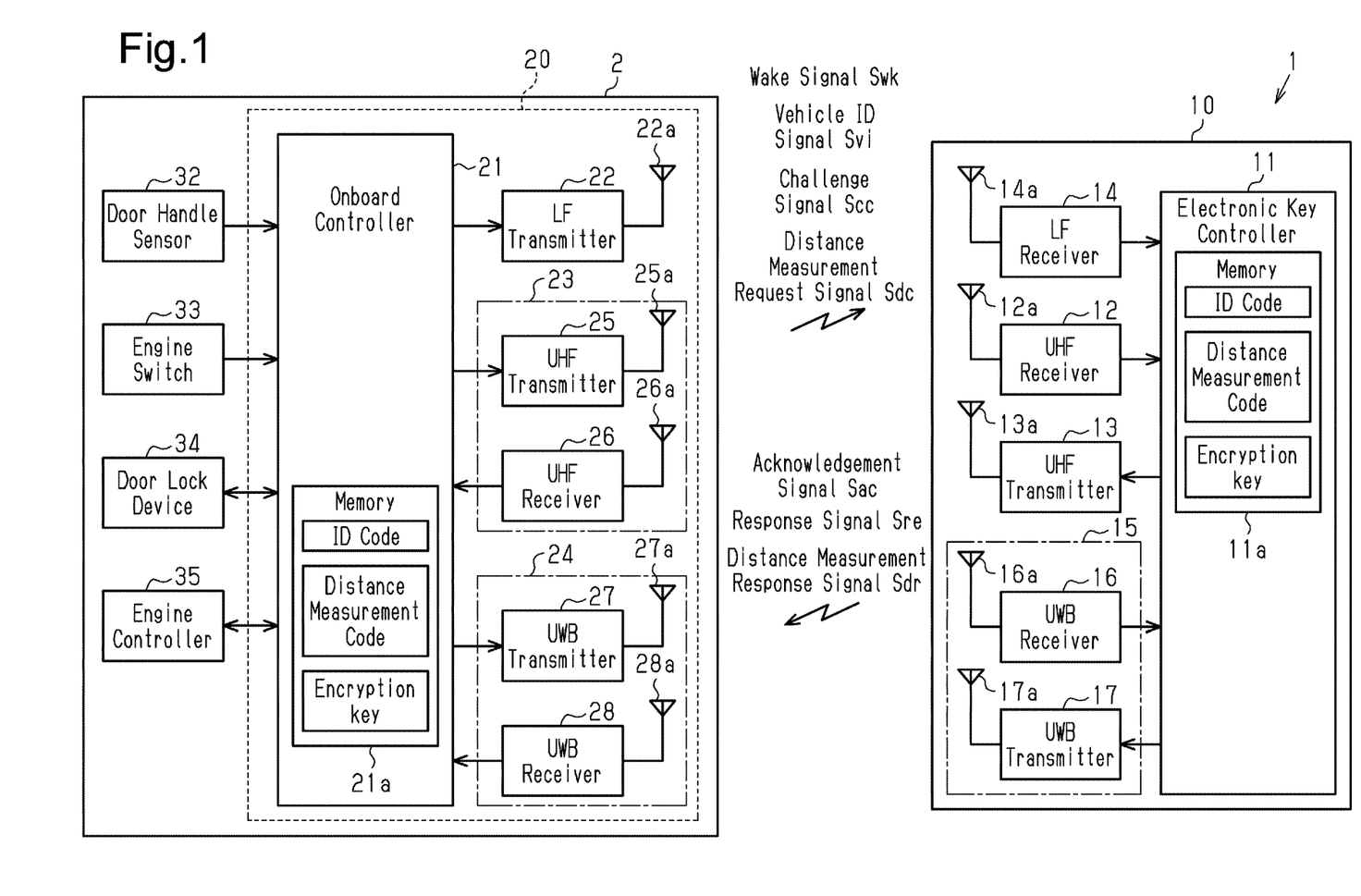
FIG. 1 is a diagram showing the configuration of an electronic key system.

As shown in FIG. 1, an electronic key system 1 includes an electronic key 10 carried by a driver and a single onboard device 20 installed in a vehicle 2. In the electronic key system 1, mutual communication is automatically performed between the electronic key 10 and the onboard device 20. Locking and unlocking of a door and starting of the engine are controlled on condition that the mutual communication is established inside and outside the vehicle.

The configuration of the electronic key 10 will now be described.

The electronic key 10 includes a wireless communication function and controls various types of onboard devices through mutual communication with the onboard device 20. The electronic key 10 includes an electronic key controller 11, a UHF receiver 12 that receives a request signal on the UHF band, a UHF transmitter 13 that transmits a response signal on the UHF band, an LF receiver 14 that receives a request signal on the LF band, and a key UWB transceiver 15 serving as a distance measurement response unit. The key UWB transceiver 15 includes a UWB receiver 16 that receives a distance measurement request signal Sdc on the ultra-wideband (UWB) and a UWB transmitter 17 that transmits a distance measurement response signal on the ultra-wideband. The electronic key controller 11 is electrically connected to the UHF receiver 12, the UHF transmitter 13, and the key UWB transceiver 15.

A request signal is transmitted from the onboard device 20, and a response signal is transmitted from the electronic key 10 in response to the request signal. The request signal and the response signal are each formed by a plurality of signals rather than a single signal. In other words, the request signal includes a wake signal Swk, a vehicle ID signal Svi, and a challenge signal Scc. The response signal includes an acknowledgement signal Sac and a response signal Sre.

When the LF receiver 14 receives a wake signal Swk on the LF band transmitted from the onboard device 20, the LF receiver 14 generates a reception signal through electrical processing such as demodulation of the wake signal Swk and sends the reception signal to the electronic key controller 11. When the electronic key controller 11 acknowledges the reception signal as a wake signal Swk, the electronic key controller 11 transmits an acknowledgement signal Sac on the UHF band to the vehicle 2 via the UHF transmitter 13. The LF receiver 14 is configured integrally with an LF reception antenna 14a.

The electronic key controller 11 further includes a non-volatile memory 11a. The memory 11a stores an ID code unique to the electronic key 10, a distance measurement code, and an encryption key. The encryption key is used to decrypt an encrypted challenge code included in a challenge signal and encrypt a distance measurement response signal Sdr. The challenge code and the distance measurement response signal Sdr may be encrypted by the same encryption key or by different encryption keys.

When the UHF receiver 12 receives a vehicle ID signal Svi and a challenge signal Scc on the UHF band transmitted from the onboard device 20, the UHF receiver 12 generates a reception signal through electrical processing such as demodulation of the signals Svi and Scc and sends the reception signal to the electronic key controller 11. When the electronic key controller 11 receives the reception signal from the UHF receiver 12, the electronic key controller 11 reads reception data included in the reception signal.

When the electronic key controller 11 acknowledges that the received wireless signal is the vehicle ID signal Svi based on the reception data, the electronic key controller 11 transmits an acknowledgement signal Sac on the UHF band to the vehicle 2 via the UHF transmitter 13. Further, when the electronic key controller 11 acknowledges that the received wireless signal is the challenge signal Scc based on the reception data, the electronic key controller 11 sends a response signal Sre including the ID code registered in the memory 11a and a response code to the UHF transmitter 13. The UHF transmitter 13 electrically processes and modulates the response signal Sre into a wireless signal on the UHF band and transmits the wireless signal to the vehicle 2. The response code is a code obtained by encrypting the challenge code with the encryption key. The UHF receiver 12 is configured integrally with a UHF reception antenna 12a. The UHF transmitter 13 is configured integrally with a UHF transmission antenna 13a.

The UWB receiver 16 is configured to receive a distance measurement request signal Sdc including an impulse signal transmitted from the onboard device 20. The impulse signal is set as an extremely short pulse signal that has a pulse width of less than or equal to 2 ns and a bandwidth of greater than or equal to 500 MHz. When measuring distance with the impulse signal, distance resolution $\Delta r$ is expressed by $\Delta r = C/2B$, where the speed of an electromagnetic wave is represented by C and the bandwidth is represented by B. If the bandwidth is 500 MHz, the distance resolution is approximately 0.3 m. When the UWB receiver 16 receives the impulse signal, the UWB receiver 16 generates a reception signal through electrical processing such as demodulation of the signal and sends the reception signal to the electronic key controller 11.

When the electronic key controller 11 receives the reception signal from the UWB receiver 16, the electronic key controller 11 encrypts a distance measurement code stored in its memory 11a, generates a distance measurement response signal Sdr including the encrypted distance measurement code and data indicating the time used to generate the distance measurement response signal Sdr, and sends the distance measurement response signal Sdr to the UWB transmitter 17. When the UWB transmitter 17 receives the distance measurement response signal Sdr from the electronic key controller 11, the UWB transmitter 17 electrically processes and modulates the distance measurement response signal Sdr into a wireless signal on the ultra-wideband and transmits the wireless signal to the vehicle 2. The UWB receiver 16 is configured integrally with a UWB reception antenna 16a. The UWB transmitter 17 is configured integrally with a UWB transmission antenna 17a.

The configuration of the onboard device will now be described.

The onboard device 20 includes an onboard controller 21 that controls various types of onboard devices, LF transmitters 22 that transmit signals on the LF band, a UHF transceiver 23, and an onboard UWB transceiver 24 serving as a distance measurement request unit. The UHF transceiver 23 is a transceiver antenna unit including a UHF transmitter 25 that transmits a signal on the UHF band and a UHF receiver 26 that receives a signal on the UHF band. The onboard UWB transceiver 24 is a transceiver antenna unit including a UWB transmitter 27 that transmits a signal on the ultra-wideband and a UWB receiver 28 that receives a signal on the ultra-wideband. The onboard controller 21 is electrically connected to the LF transmitters 22, the UHF transceiver 23, and the onboard UWB transceiver 24.

The onboard controller 21 is also electrically connected to a door handle sensor 32 arranged on a door handle to detect whether the user has touched the door handle, an engine switch 33 operated to start the engine, a door lock device 34 that automatically locks or unlocks a vehicle door, and an engine controller 35 that controls the starting of the engine of the vehicle 2.

Figure 2:
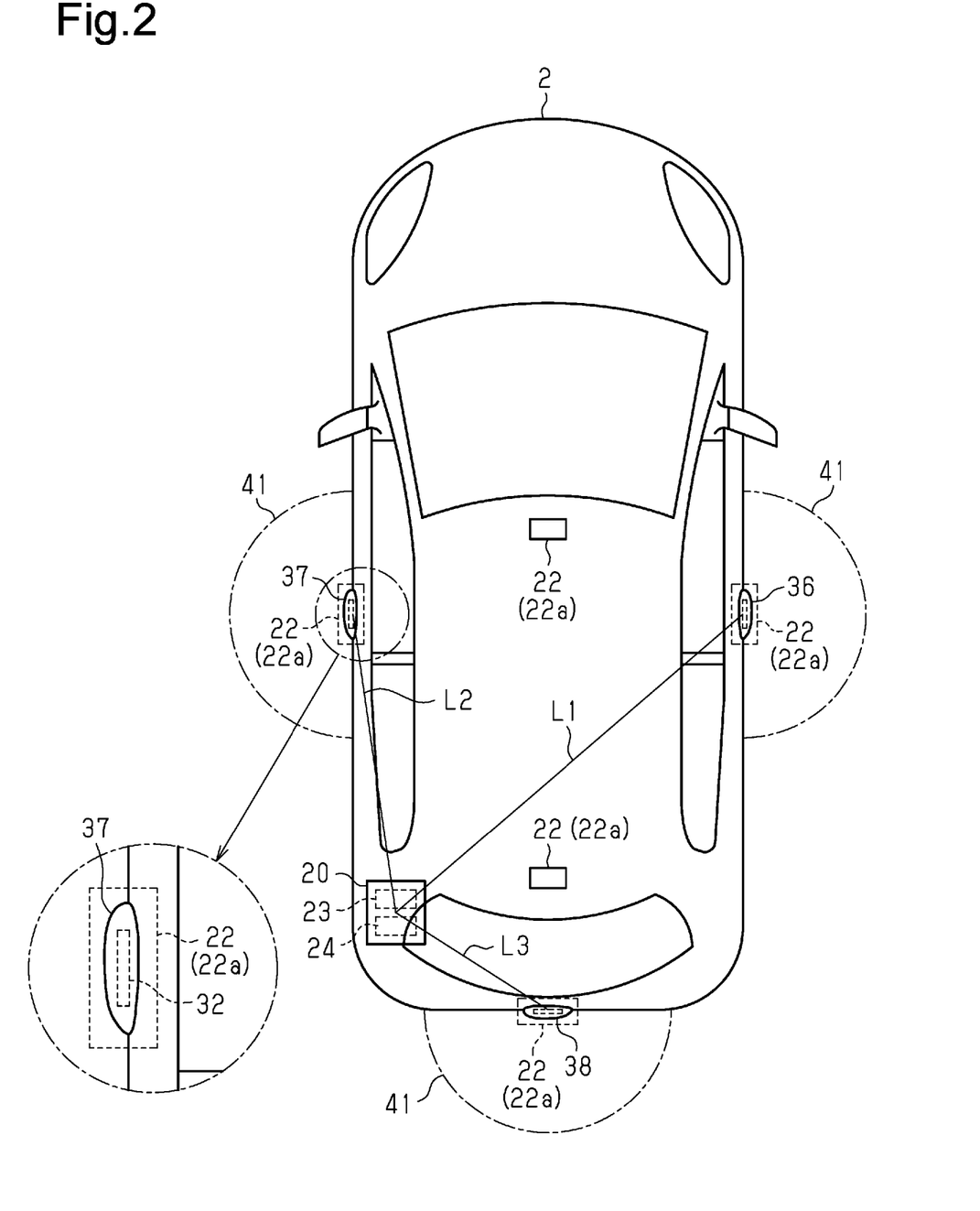
FIG. 2 is a schematic diagram of a vehicle showing communication areas and the positional relationship of an onboard device and transmission antennas.

As shown in FIG. 2, the LF transmitters 22 are arranged inside the vehicle, inside the door handles 36 and 37 of vehicle doors near the driver seat and the passenger seat of the vehicle 2, and inside a door handle 38 of the trunk. When the LF transmitters 22 receive a wake signal Swk from the onboard controller 21, the LF transmitters 22 electrically process and modulate the wake signal Swk into a wireless signal on the LF band. Then, the LF transmitters 22 transmit the wireless signal via the corresponding LF transmission antennas 22a to communication areas 41 formed around the vehicle 2 in predetermined intermittent intervals. The exterior communication areas 41 are semicircular so that the corresponding bases centered about the LF transmitters 22 in the door handles 36 to 38 extend along the vehicle body. Further, the LF transmitters 22 arranged inside the vehicle transmit a wake signal Swk to a communication area (not shown) formed inside the entire vehicle. The wake signal Swk is an instruction signal for shifting the electronic key 10 from a standby state to an active state. The LF transmitter 22 is configured integrally with the LF transmission antenna 22a.

The onboard controller 21 transmits the wake signal Swk via the corresponding LF transmitters 22 at different times. This allows the onboard controller 21 to determine not only whether the electronic key 10 is located inside or outside the vehicle based on the reply time of the acknowledgement signal Sac but also which one of the communication areas 41 formed near the doors the electronic key 10 is located in. That is, in the present embodiment, each LF transmission antenna 22a corresponds to a transmission antenna, and the onboard controller 21 and the LF transmitters 22 configure a key location determination unit that determines where the electronic key 10 is located based on the locations of the LF transmission antennas 22a. In the present embodiment, the key location determination unit is included in the onboard device 20. The onboard controller 21 sets a threshold range 42 used as a reference when performing distance verification, which will be described later, based on the distance from the communication area 41 where the electronic key 10 is located to the onboard UWB transceiver 24.

Figure 3:
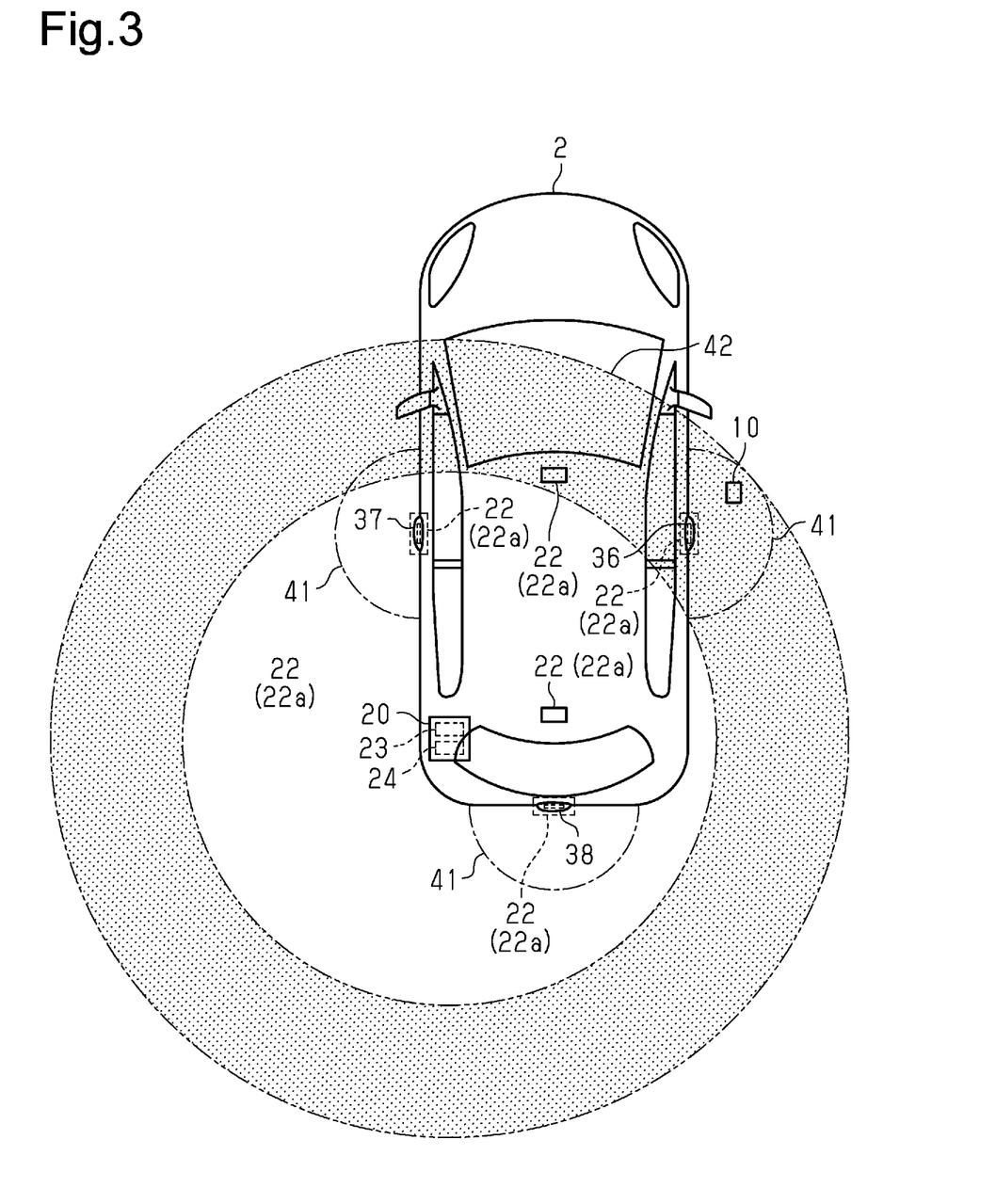
FIG. 3 is a schematic diagram showing the periphery of the vehicle during vehicle exterior communication.

Specifically, as shown in FIG. 3, for example, if the electronic key 10 is located in the communication area 41 formed around the LF transmission antenna 22a of the door handle 36 near the driver seat, the area around the onboard UWB transceiver 24 is set as a threshold range 42 in which the shortest distance from the communication area 41 to the onboard UWB transceiver 24 is the inner limit of the threshold range 42 and the longest distance from the communication area 41 to the onboard UWB transceiver 24 is the outer limit of the threshold range 42. The threshold range 42 is set in the same manner when the electronic key 10 is located in the communication area 41 formed around the LF transmission antenna 22a of the door handle 37 near the passenger seat and when the electronic key 10 is located in the communication area 41 formed around the LF transmission antenna 22a of the door handle 38 for the trunk.

As shown in FIG. 2, the UHF transceiver 23 and the onboard UWB transceiver 24 are arranged in the rear left side of the vehicle. The onboard UWB transceiver 24 is separated by different distances to the LF transmission antennas 22a of the LF transmitters 22. In other words, the LF transmitters 22 are each arranged so that the distance to the onboard UWB transceiver 24 differs between the LF transmission antennas 22a. In the present embodiment, the separated distance L1 from the onboard UWB transceiver 24 to the LF transmission antenna 22a in the door handle 36 near the driver seat is the longest. The separated distance L2 from the onboard UWB transceiver 24 to the LF transmission antenna 22a in the door handle 37 near the passenger seat comes next in order of longer distance to shorter distance, and the separated distance L3 from the onboard UWB transceiver 24 to the LF transmission antenna 22a in the door handle 38 of the trunk is the shortest.

Further, as shown in FIG. 1, the UHF transceiver 23 and the onboard UWB transceiver 24 are configured to communicate with the electronic key 10 located inside or outside the vehicle.

When the UHF transmitter 25 receives a vehicle ID signal Svi and a challenge signal Scc from the onboard controller 21, the UHF transmitter 25 electrically processes and modulates the signals Svi, Scc into wireless signals on the UHF band and transmits the wireless signals via a UHF transmission antenna 25a to a wide communication area (not shown) extending around the vehicle 2 in predetermined intermittent intervals. When the onboard controller 21 transmits the challenge signal Scc, the onboard controller 21 generates a response code by encrypting a challenge code with the encryption key held in the onboard controller 21. Further, the challenge signal Scc includes a challenge code used as a random number. When the UHF receiver 26 receives, via a UHF reception antenna 26a, an acknowledgement signal Sac and a response signal Sre transmitted from the electronic key 10, the UHF receiver 26 generates a reception signal through electrical processing such as demodulation of the signals Sac, Sre and sends the reception signal to the onboard controller 21. The UHF transmitter 25 is configured integrally with the UHF transmission antenna 25a. The UHF receiver 26 is configured integrally with the UHF reception antenna 26a.

When the UWB transmitter 27 receives a distance measurement response signal Sdr from the onboard controller 21, the UWB transmitter 27 electrically processes and modulates the distance measurement response signal Sdr into a wireless signal on the ultra-wideband and transmits the wireless signal via a UWB transmission antenna 27a to a wide communication area (not shown) that surrounds the vehicle 2. Further, when the UWB receiver 28 receives, via a UWB reception antenna 28a, a distance measurement response signal Sdr transmitted from the electronic key 10, the UWB receiver 28 generates a reception signal through electrical processing such as demodulation of the signal Sdr and sends the reception signal to the onboard controller 21. The UWB transmitter 27 is configured integrally with the UWB transmission antenna 27a. The UWB receiver 28 is configured integrally with the UWB reception antenna 28a.

The onboard controller 21 includes a nonvolatile memory 21a. The memory 21a stores an ID that is the same as that set in the corresponding electronic key 10, a distance measurement code that is the same as that set in the corresponding electronic key 10, and an encryption key. The encryption key is used to calculate a response code and decrypt a distance measurement response signal Sdr. The decryption of the distance measurement response signal Sdr and calculation of the response code may be performed using the same encryption key or different encryption keys. The onboard controller 21 determines whether authorized communication has been performed with the electronic key 10 based on ID code verification, response verification, and distance verification.

Specifically, when the onboard controller 21 receives, via the UHF receiver 26, a response signal Sre transmitted from the electronic key 10 in response to a challenge signal Scc transmitted via the UHF transmitter 25, the onboard controller 21 performs ID code verification on the ID code included in the response signal Sre with the ID code stored in the memory 21a. In the ID code verification, successful verification is determined if the ID code included in the response signal Sre matches the ID code stored in the memory 21a.

The onboard controller 21 performs response verification by collating the response code included in the response signal Sre and the response code calculated with the encryption key by the onboard controller 21. In the response verification, successful collation is determined if the response code included in the response signal Sre matches the response code calculated with the encryption key by the onboard controller 21.

Further, the onboard controller 21 performs distance verification by collating a measurement distance calculated based on the distance measurement request signal Sdc and the distance measurement response signal Sdr and the threshold range 42 set based on the communication area 41 in which the electronic key 10 is located. In the distance verification, when the onboard controller 21 receives the distance measurement response signal Sdr, the onboard controller 21 uses the encryption key to calculate the distance measurement code included in the distance measurement response signal Sdr and a response time required for the electronic key 10 from when the distance measurement request signal Sdc is received to when the distance measurement response signal Sdr is transmitted. The onboard controller 21 collates the distance measurement code included in the distance measurement response signal Sdr with the distance measurement code stored in its memory 21a to determine whether the distance measurement response signal Sdr is a signal transmitted as a response from the electronic key 10. If the distance measurement response signal Sdr is a signal transmitted as a response from the electronic key 10, the onboard controller 21 measures the distance from the onboard UWB transceiver 24 to the electronic key 10 (key UWB transceiver 15) based on the round-trip time required for the distance measurement request signal Sdc to be transmitted and the distance measurement response signal Sdr to be received and the response time included in the distance measurement response signal Sdr. In the distance verification, successful collation is determined if the measurement distance is included in the threshold range 42.

In a case in which the electronic key 10 is determined as being located outside the vehicle, if the above authenticity determination determines that authorized communication is performed as described above, the vehicle door is shifted to an unlockable state with successful vehicle exterior verification. In this unlockable state, when the onboard controller 21 detects that the user touches the door handle through the door handle sensor 32, the onboard controller 21 unlocks the vehicle door through the door lock device 34.

If it is determined in the authenticity determination that authorized communication is being performed when determined that the electronic key 10 is located inside the vehicle, this indicates that vehicle interior verification has been accomplished and starting of the engine is permitted. In the state in which engine starting is permitted, when the engine switch 33 arranged near the driver seat is operated, an operation signal is sent to the onboard controller 21. When the onboard controller 21 detects the operation signal in the state in which engine starting is permitted, the onboard controller 21 sends an instruction signal to the engine controller 35. The engine controller 35 drives a starter (not shown) based on the instruction signal and starts engine control.

The procedures for processing authenticity determination in vehicle exterior verification between the electronic key 10 the onboard device 20 will now be described.

Figure 4:
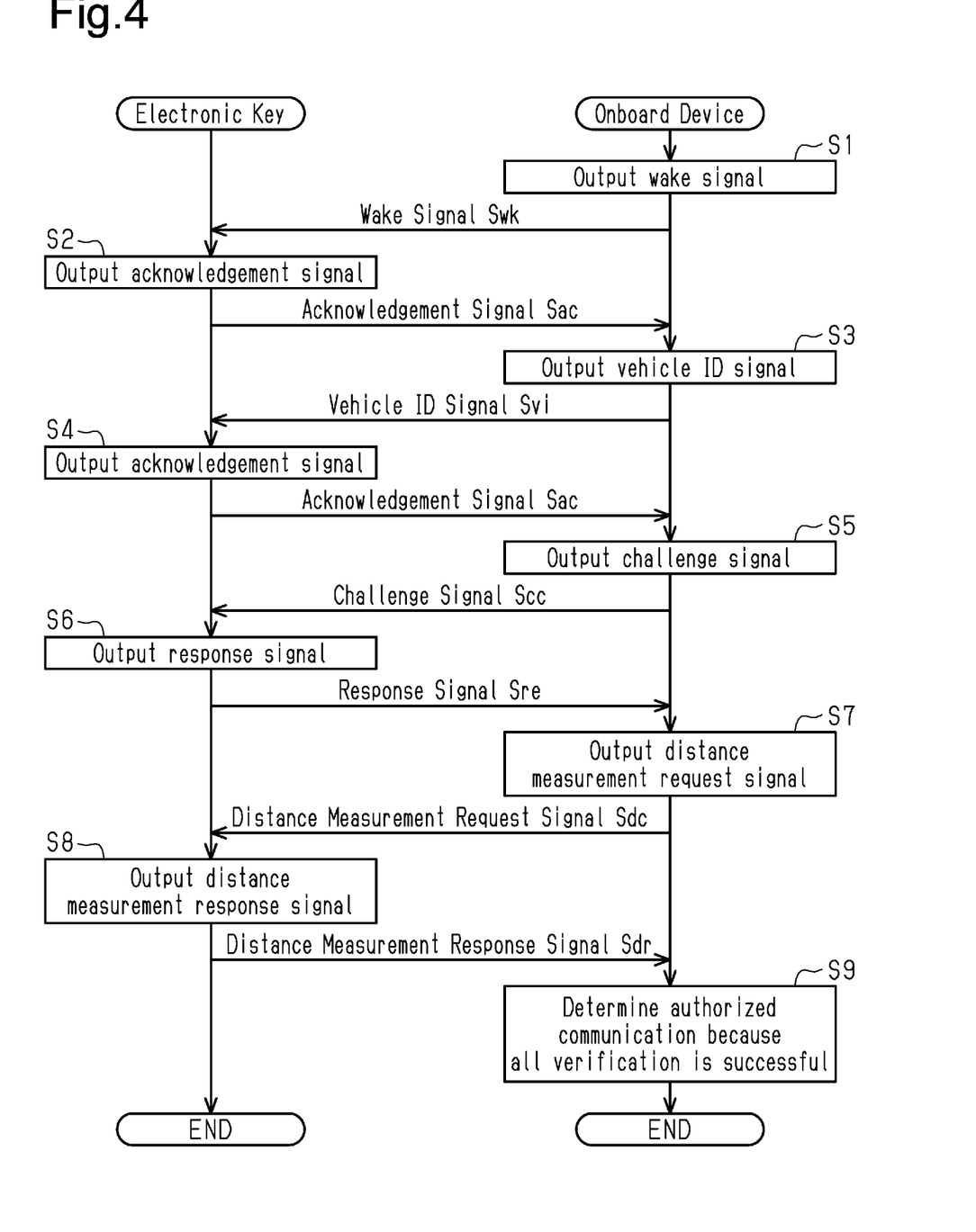
FIG. 4 is a flowchart showing the procedures for processing authenticity determination during vehicle exterior verification performed between an electronic key and an onboard device.

As shown in FIG. 4, the onboard device 20 intermittently transmits a wake signal Swk on the LF band from the LF transmitter 22 to the communication area 41 to determine whether the electronic key 10 is located in the communication area 41 (step S1). If the electronic key 10 enters the communication area 41 and receives the wake signal Swk, the electronic key 10 shifts the operating state from a standby state to an active state and transmits an acknowledgement signal Sac to the vehicle 2 so as to notify the shifting of the operating state (step S2).

When the onboard device 20 receives the acknowledgement signal Sac, the onboard device 20 determines which one of the communication areas 41 the electronic key 10 is located in, and the onboard device 20 transmits a vehicle ID signal Svi from the UHF transmitter 25 (step S3). When the electronic key 10 receives the vehicle ID signal Svi, the electronic key 10 determines whether the vehicle 2 is an authorized vehicle through vehicle ID verification that determines whether the vehicle ID signal Svi has been transmitted from the corresponding vehicle 2. By performing the vehicle ID verification in this manner, even in a situation where a number of vehicles are present around the electronic key 10 and request signals are received from the vehicles, communication is established with only the authorized vehicle in relation with the authenticity determination following the reception of vehicle ID signal Svi. Then, when the electronic key 10 acknowledges successful vehicle ID verification, the electronic key 10 transmits an acknowledgement signal Sac to the vehicle 2 so as to notify the successful vehicle ID verification (step S4).

When the onboard device 20 receives the acknowledgement signal Sac in a normal manner after transmitting the vehicle ID signal Svi, the onboard device 20 acknowledges that the vehicle ID verification with the electronic key 10 was successful and that the electronic key 10 in the communication area 41 is paired with the onboard device 20. In this case, the onboard device 20 sets the threshold range 42 based on the distance to the communication area 41 where the electronic key 10 is located. Then, the onboard device 20 transmits a challenge signal Scc from the UHF transmission antenna 25a (step S5). When the electronic key 10 receives the challenge signal Scc from the vehicle 2, the electronic key 10 transmits a response signal Sre including the ID code registered in its memory 11a and a response code to the vehicle 2 (step S6).

When the onboard device 20 receives the response signal Sre, the onboard device 20 performs ID verification by collating the ID code included in the response signal Sre with the ID code stored in its memory 21a. Further, the onboard device 20 performs response verification by collating the response code of the electronic key 10 with the response code calculated by the onboard device 20. If the onboard device 20 determines that the ID code verification and the response verification are successful, the onboard device 20 transmits a distance measurement request signal Sdc including the distance measurement code from the UWB transmitter 27 (step S7). When the electronic key 10 receives the distance measurement request signal Sdc from the vehicle 2, the electronic key 10 transmits a distance measurement response signal Sdr including the distance measurement code stored in its memory 11a and a response time required to generate the distance measurement response signal Sdr to the vehicle 2 (step S8).

When the onboard device 20 receives the distance measurement response signal Sdr, the onboard device 20 performs verification by collating the distance measurement code included in the distance measurement response signal Sdr with the distance measurement code stored in its memory 21a. If the distance measurement codes match, the onboard device 20 measures the distance to the electronic key 10 based on the response time and the reciprocating time and performs distance verification. If the ID verification, the response verification, and the distance verification are successful, vehicle exterior verification that is authorized communication is successful. Thus, unlocking of the vehicle door is permitted (step S9). Vehicle interior verification is basically performed in the same manner as vehicle exterior verification. If vehicle interior verification is successful, starting of the engine is permitted.

The present embodiment has the advantages described below.

(1) In the electronic key system 1, conditions for determining in authenticity determination authorized communication include successful distance verification indicating that the measurement distance from the onboard UWB transceiver 24 to the electronic key 10 is within the threshold range 42. If unauthorized communication is performed via a relay device, a distance measurement response signal Sdr is transmitted and received between the relay device and the electronic key 10, which is at a location remote from the vehicle 2 (onboard device 20). Thus, the measurement distance determined based on the distance measurement request signal Sdc and the distance measurement response signal Sdr transmitted and received via the relay device differs from the distance between the relay device located in the communication area 41 and the onboard UWB transceiver 24. In other words, when unauthorized communication is performed via the relay device, the calculated measurement distance is longer than the distance from the communication area of the LF transmission antenna 22a to the onboard UWB transceiver 24. The threshold range 42 is set based on the distance from the communication area 41 in which the electronic key 10 or the relay device is located to the onboard UWB transceiver 24. This prevents establishment of unauthorized communication via the relay device that would occur when the measurement distance is within the threshold range 42 under the condition that authorized communication is determined during authenticity determination.

(2) The distance measurement request signal Sdc and the distance measurement response signal Sdr use signals on the ultra-wideband. This determines the measurement distance from the onboard UWB transceiver 24 to the electronic key 10 (key UWB transceiver 15) with high accuracy.

(3) The LF transmission antennas 22a of the LF transmitters 22 are arranged inside the vehicle, inside the door handles 36 and 37 of vehicle doors near the driver seat and the passenger seat of the vehicle 2, and inside the door handle 38 of the trunk. When conditions for determining authorized communication includes that the measurement distance being within the threshold range 42 based on the distance from the communication area 41 of the LF transmission antenna 22a in which the electronic key 10 is located to the onboard UWB transceiver 24, a narrower threshold range 42 can be set for a narrower communication area 41. This performs authenticity determination with improved accuracy. According to the structure, since the LF transmission antennas 22a are arranged at different locations of the vehicle, the location of the electronic key 10 is determined over a wide area around the vehicle without enlarging the communication area of a single transmission antenna. This performs authenticity determination with improved accuracy for an authorized user carrying the electronic key 10 that may approach the vehicle 2 from any of various directions.

(4) The LF transmission antennas 22a of the LF transmitters 22 are arranged in the vehicle 2 at different distances from the onboard UWB transceiver 24 so that each LF transmission antenna 22a has a different threshold range 42 for detecting the presence of the electronic key 10. This prevents establishment of unauthorized communication via the relay device.

(5) The vehicle includes only one onboard UWB transceiver 24 and thereby reduces costs.

The above embodiment may be modified as follows.

The electronic key system 1 includes one or more processors. In a specific embodiment, the processor includes hardware that executes instructions of a computer program. In a non-limiting example, when instructions are executed, the processor may retrieve the instructions from a memory (such as memory 21a), decrypt, and execute the instructions.

In the above embodiment, the distance measurement response signal Sdr includes an encrypted distance measurement code when transmitted. Instead, the structure of the distance measurement response signal Sdr a may be modified as long as it can be determined whether the distance measurement response signal Sdr is a signal transmitted as a response from the electronic key 10. For example, the distance measurement response signal Sdr may include a response code. In this case, the distance measurement code does not need to be included. Further, the distance measurement response signal Sdr may include a non-encrypted code when transmitted. Further, the distance measurement response signal Sdr may be transmitted without including the response time of the electronic key 10. A separate signal that indicates the response time may be transmitted.

In the above embodiment, the LF transmission antennas 22a of the LF transmitters 22 are arranged so that the distance from the LF transmission antenna 22a to the onboard UWB transceiver 24 differs between the LF transmission antennas 22a. Instead, the arrangement may be modified so that the LF transmission antennas 22a are arranged at the same distance. Further, in the above embodiment, the LF transmitters 22 (LF transmission antennas 22a) may be arranged at different locations such as in the door handles of the backseats. Further, only one LF transmission antenna 22a of the LF transmitter 22 may be arranged in, for example, the door handle 36 near the driver seat instead of the plurality of the LF transmission antennas 22a.

In the above embodiment, the distance verification is performed after the response verification is performed. Instead, the distance verification may be performed before the response verification as the order of collation may be modified.

In the above embodiment, the area around the onboard UWB transceiver 24 is set as the threshold range 42 in which the distance from the communication area 41 within which the electronic key 10 is located to the onboard UWB transceiver 24 has the shortest distance as the inner limit and the longest distance as the outer limit. Instead, the area of the threshold range 42 may be modified so that a distance greater than the shortest distance serves as the inner limit and a distance less than the longest distance serves as the outer limit, for example.

In the above embodiment, the onboard controller 21 calculates the measurement distance as a single value based on the distance measurement request signal Sdc and the distance measurement response signal Sdr. Instead, the measurement distance from the onboard UWB transceiver 24 to the electronic key 10 may be calculated to have a wide range to tolerate error. In this case, if the range of a measurement distance is overlapped with the threshold range 42, for example, the distance verification is determined to be successful.

In the above embodiment, the vehicle ID signal Svi, the challenge signal Scc, and the response signal Sre are communicated through UHF signals. Instead, the signals may be communicated through UWB signals. In this case, the distance to the electronic key 10 may be measured using, for example, the vehicle ID signal Svi, the challenge signal Scc, and the response signal Sre. That is, a request signal may be used as the distance measurement request signal Sdc, and a response signal may be used as the distance measurement response signal Sdr.

In the above embodiment, signals on the ultra-wideband are used as the distance measurement request signal Sdc and the distance measurement response signal Sdr. However, signals on other frequency bands or light may be used as long as the distance is measured.

In the above embodiment, a plurality of onboard UWB transceivers 24 may be arranged at different locations of the vehicle, and the threshold range 42 may be set based on measurement distances from the onboard UWB transceivers 24 to the electronic key 10 and the corresponding locations of the onboard UWB transceivers 24, thereby performing distance verification plural times.

In the above embodiment, the distance measurement request signal Sdc is transmitted from the onboard UWB transceiver 24, and the distance measurement response signal Sdr is transmitted from the key UWB transceiver 15. That is, the onboard device 20 includes the distance measurement request unit, and the electronic key 10 includes the distance measurement response unit. Instead, the distance measurement request signal Sdc may be transmitted from the key UWB transceiver 15, and the distance measurement response signal Sdr may be transmitted from the onboard UWB transceiver 24. That is, the electronic key 10 may include the distance measurement request unit, and the onboard device 20 may include the distance measurement response unit.

The present disclosure includes the following implementation example. Reference numerals are given to facilitate understanding in a nonrestrictive manner.

Implementation Example 1

An electronic key system (1) including an onboard device (20) installed in a vehicle (2) and an electronic key (10) carried by a user, the electronic key system (1) including:

a distance measurement request transceiver (24) included in one of the onboard device (20) and the electronic key (10), wherein the distance measurement request transceiver (24) transmits a distance measurement request signal and receives a distance measurement response signal in response to the distance measurement request signal;

a distance measurement response transceiver (15) included in the other one of the onboard device (20) and the electronic key (10), wherein the distance measurement response transceiver (15) receives the distance measurement request signal and transmits the distance measurement response signal in response to the distance measurement request signal;

one or more processors; and a memory (21a) connected to the one or more processors, wherein the memory (21a) stores instructions executable by the one or more processors, wherein the one or more processors when executing the instructions determine the location of the electronic key (10) based on the location of a transmission antenna (22a) of the distance measurement request transceiver (24) or the distance measurement response transceiver (15) included in the onboard device (20), calculate a measurement distance from the distance measurement request transceiver (24) to the distance measurement response transceiver (15) based on the distance measurement request signal and the distance measurement response signal, determine whether the measurement distance is within a threshold range set based on the distance from a communication area of the transmission antenna (22a) where the electronic key (10) is determined to be located to the distance measurement request transceiver (24) or the distance measurement response transceiver (15) included in the onboard device (20), and determine whether authorized communication is performed based on a result of the determination of whether the measurement distance is within the threshold range.

Implementation Example 2

The electronic key system (1) according to implementation example 1, wherein the vehicle includes only one of the distance measurement request transceiver (24) or distance measurement response transceiver (15) included in the onboard device (20). This structure reduces costs.

DESCRIPTION OF THE REFERENCE NUMERALS

1 . . . electronic key system, 2 . . . vehicle, 10 . . . electronic key, 11 . . . electronic key controller, 15 . . . key UWB transceiver (distance measurement response unit), 16 . . . UWB receiver, 17 . . . UWB transmitter, 20 . . . onboard device, 21 . . . onboard controller, 22 . . . LF transmitter, 22a . . . LF transmission antenna (transmission antenna), 23 . . . UHF transceiver, 24 . . . onboard UWB transceiver (distance measurement request unit), 41 . . . communication area, 42 . . . threshold range, L1 to L3 . . . separated distances, Sac . . . acknowledgement signal, Scc . . . challenge signal, Sdc . . . distance measurement request signal, Sdr . . . distance measurement response signal, Sre . . . response signal, Svi . . . vehicle ID signal, Swk . . . wake signal

The invention claimed is:

1. An electronic key system, including an onboard device installed in a vehicle and an electronic key carried by a user, wherein the electronic key system performs authenticity determination to determine whether authorized communication is performed based on response signals transmitted from the electronic key in response to a plurality of request signals from the onboard device, the electronic key system comprising:

a plurality of transmission antennas that are arranged in the vehicle at different locations and that transmit the plurality of request signals, wherein the plurality of transmission antennas, respectively, have a plurality of first communication areas, and the plurality of first communication areas are, respectively, associated with a plurality of threshold ranges;

a key location determination unit that determines a first communication area, in which the electronic key is located, from the plurality of first communication areas based on the response signals;

a distance measurement request unit included in the onboard device, wherein the distance measurement request unit transmits a distance measurement request signal and receives a distance measurement response signal in response to the distance measurement request signal, and the distance measurement response unit is an onboard transceiver; and a distance measurement response unit included in the electronic key, wherein the distance measurement response unit receives the distance measurement request signal and transmits the distance measurement response signal in response to the distance measurement request signal, and the distance measurement response unit is a key transceiver, wherein the distance measurement request unit has a second communication area that is wider than the first communication area of the transmission antenna, and the distance measurement response unit has a third communication area that is wider than the first communication area of the transmission antenna, and wherein the authenticity determination by the key location determination unit, determines the first communication area, in which the electronic key is located, from the plurality of first communication areas based on the response signals, sets a threshold range that is associated with the determined first communication area, by the distance measurement request unit, transmits the distance measurement request signal, by the distance measurement response unit, receives the distance measurement request signal and transmits the distance measurement response signal in response to the distance measurement request signal, measures a distance from the distance measurement request unit to the distance measurement response unit based on the distance measurement request signal and the distance measurement response signal, and determines that authorized communication is performed based on a condition including that the measured distance is within the set threshold range, wherein each of the plurality of threshold ranges is set based on a distance from a corresponding first communication area to the distance measurement request unit included in the onboard device, the transmission antennas are arranged in the vehicle distanced differently from the distance measurement request unit included in the onboard device, and each of the distance measurement request unit and the distance measurement response unit includes a transceiver antenna that differs from the plurality of transmission antennas.

2. The electronic key system according to claim 1, wherein the distance measurement request signal and the distance measurement response signal are ultra-wideband wireless signals.

3. An electronic key system, including an onboard device installed in a vehicle and an electronic key carried by a user, wherein the electronic key system performs authenticity determination to determine whether authorized communication is performed based on response signals transmitted from the electronic key in response to a plurality of request signals from the onboard device, the electronic key system comprising:

a plurality of transmission antennas that are arranged in the vehicle at different locations and that transmit the plurality of request signals, wherein the plurality of transmission antennas, respectively, have a plurality of first communication areas, and the plurality of first communication areas are, respectively, associated with a plurality of threshold ranges;

a key location determination unit that determines a first communication area, in which the electronic key is located, from the plurality of first communication areas based on the response signals;

a distance measurement request unit included in the electronic key, wherein the distance measurement request unit transmits a distance measurement request signal and receives a distance measurement response signal in response to the distance measurement request signal, and the distance measurement request unit is a key transceiver; and a distance measurement response unit included in the onboard device, wherein the distance measurement response unit receives the distance measurement request signal and transmits the distance measurement response signal in response to the distance measurement request signal, and the distance measurement response unit is an onboard transceiver, wherein the distance measurement request unit has a second communication area that is wider than the first communication area of the transmission antenna, and the distance measurement response unit has a third communication area that is wider than the first communication area of the transmission antenna, and wherein the authenticity determination
by the key location determination unit, determines the first communication area, in which the electronic key is located, from the plurality of first communication areas based on the response signals,
sets a threshold range that is associated with the determined first communication area,
by the distance measurement request unit, transmits the distance measurement request signal,
by the distance measurement response unit, receives the distance measurement request signal and transmits the distance measurement response signal in response to the distance measurement request signal,
measures a distance from the distance measurement request unit to the distance measurement response unit based on the distance measurement request signal and the distance measurement response signal, and
determines that authorized communication is performed based on a condition including that the measured distance is within the set threshold range, and wherein each of the plurality of threshold ranges is set based on a distance from a corresponding first communication area to the distance measurement response unit included in the onboard device, the transmission antennas are arranged in the vehicle distanced differently from the distance measurement response unit included in the onboard device, and each of the distance measurement request unit and the distance measurement response unit includes a transceiver antenna that differs from the plurality of transmission antennas.

* * * * *